(12) United States Patent
Tomida

(10) Patent No.: US 6,281,989 B1
(45) Date of Patent: *Aug. 28, 2001

(54) MULTI-FUNCTIONAL DEVICE FOR RECEIVING, STORING AND PURGING INFORMATION

(75) Inventor: Wataru Tomida, Owariasahi (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,738

(22) Filed: Apr. 4, 1997

(30) Foreign Application Priority Data

May 20, 1996 (JP) .................................................. 8-124467
Oct. 7, 1996 (JP) .................................................. 8-265930

(51) Int. Cl.[7] ..................................................... H04N 1/32
(52) U.S. Cl. ........................... 358/442; 358/444; 358/468
(58) Field of Search ..................................... 358/404, 442, 358/444, 468; 379/100.15, 112

(56) References Cited

U.S. PATENT DOCUMENTS

| | | | |
|---|---|---|---|
| 4,525,601 | * 6/1985 | Barnich et al. | 379/112 |
| 4,581,605 | * 4/1986 | Vogt | 340/525 |
| 4,720,750 | * 1/1988 | Watanable | 347/129 |
| 4,907,094 | * 3/1990 | Mishima et al. | 358/404 |
| 5,311,327 | * 5/1994 | Fukushima et al. | 358/444 |
| 5,621,540 | * 4/1997 | Terajima | 358/404 |
| 5,778,163 | * 7/1998 | Terajima | 358/442 |
| 5,923,439 | * 7/1999 | Tomida et al. | 358/404 |

* cited by examiner

Primary Examiner—Jon Chang
Assistant Examiner—Jinggee Wu
(74) Attorney, Agent, or Firm—Oliff & Berridge, PLC

(57) ABSTRACT

A multi-functional device operative with a data processor and comprising a storage unit, a reception unit and a data ejection unit. Where an area of the storage unit still retains print data previously sent from the data processor, the device may perform a new process such as receiving fax data or a voice signal by use of a communication function or reading of images through a copy function. When the reception unit receives a signal while print data is held in the memory unit, the data ejection unit purges the residual print data if a remaining capacity of the memory unit is found to be below a predetermined level.

41 Claims, 4 Drawing Sheets

MULTI-FUNCTIONAL DEVICE FOR RECEIVING, STORING AND PURGING INFORMATION

BACKGROUND OF THE INVENTION

1. Field of the Invention

The present invention relates to a multi-functional device having a receiver for receiving signals via a communication line, a transceiver for transmitting to and receiving data from a data processor, and a storage unit for storing the signals received by the receiver as well as the data received by the transceiver.

2. Description of the Related Art

Today, it is becoming a widespread practice to equip a data processor such as a personal computer with a facsimile machine by incorporating a facsimile modem to implement facsimile communications by way of the personal computer. In this arrangement, a printer of the facsimile machine may be utilized to print print data prepared by the personal computer.

Generally, the above type of facsimile machine includes two kinds of memory: a fax data recording memory for storing received fax data to be printed and a print data recording memory for storing the print data. These memories are usually of a volatile type. Where the fax data recording memory and the print data recording memory are separately provided, the volatile memory arrangement tends to be larger in capacity and thus it costs more.

As a solution to a problem of growing memory cost, a memory-sharing type facsimile machine has been proposed. The proposed machine reduces the volatile memory capacity by locating a fax data recording memory area, a print data recording memory area and other recording memory areas in a single volatile memory.

One disadvantage of the proposed setup is that print data, once stored in the allocated recording area, remains intact if a page-feed command, a recording-end command or subsequent page data is not sent or if the user fails to perform a recording-end operation.

In the above memory-sharing type facsimile machine, its memory can soon overflow when fax data is received over the communication line if the memory retains previous print data reducing the capacity of the remaining memory area.

With the memory full of data, the fax data being received or to be subsequently admitted will no longer be accommodated. A reception error is then recognized, terminating the communication function of the facsimile machine partially through the ongoing operation and inconveniencing the user.

A similar deficiency is experienced with facsimile machines having the so-called answering phone function. With this type of facsimile machine, voice signals are received and converted to voice data for storage into the applicable memory area. Also, in this case, any remaining print data in memory diminishes the available memory capacity for accommodating fax data being received. A reception error may then be detected, terminating the communication function of the facsimile machine partially through an ongoing operation.

The memory-sharing type facsimile machine has another disadvantage. With the remaining memory capacity reduced by the presence of residual print data, it may happen that the memory further receives other print data from the personal computer intending to perform another process or image data from a scanner of the facsimile machine executing a facsimile transmission or a document copying operation. In such cases, the memory capacity may not be large enough to accommodate the incoming print data or image data. When the data storing operation is aborted by lack of memory space, the user is again inconvenienced.

SUMMARY OF THE INVENTION

An object of the present invention is to overcome the above and other disadvantages and deficiencies of the prior art and to provide a multi-functional peripheral device which, with a recording area of its memory still retaining print data sent from a data processor, can perform another process such as receiving fax data or voice signals by means of a communication function or reading of image data through the use of a copy function.

In carrying out the invention and according to a first aspect thereof, there is provided a multi-functional device comprising: a receiver for receiving signals via a communication line; a transceiver for transmitting to and receiving data from a data processor; a storage unit for storing the signals received by the receiver as well as the data received by the transceiver; and a data ejector for purging any print data from the storage unit either when a signal is received by the transceiver or when data for performing a predetermined process is sent to the storage unit.

The multi-functional device of the above constitution works as follows: when the storage unit holds any residual print data, the data ejector purges the print data from the storage unit if the device receives a signal over the communication line or if data for performing a predetermined process is sent to the storage unit. This allows the device to secure sufficient memory space in the storage unit to accommodate the received data such as fax data or voice data converted from voice signals as well as data for carrying out the predetermined process. The storage unit never overflows with data. There is no possibility of the storage unit being exhausted in capacity and becoming incapable of receiving the currently arriving signal or a subsequent incoming signal for any specific process to be carried out. That is, there will be no reception error that would stop partially through the communication function of the multi-functional device or hamper execution of any desired process.

Illustratively, the data processor may be a personal computer. The multi-functional device may be an apparatus comprising a facsimile function, a printer function, a copy function, a scanner function and an answering phone function. Alternatively, a plurality of devices, each including at least one of the above functions, may be interconnected by cable or by radio waves to constitute a multi-functional device. Print data may include text data prepared by a word processor or with word processor software and made up of texts and images, as well as image data and copy data read in by a scanner. The transceiver may be a wired or a wireless type. The storage unit may be practiced in the form of a RAM or a flash memory. The data ejector is implemented by the CPU executing an appropriate program.

According to a second aspect of the invention, there is provided a multi-functional device comprising: a receiver for receiving data via a communication line; a transceiver for transmitting and receiving data to and from a data processor; a storage unit for storing the data received by the receiver as well as print data received by the transceiver; and a data ejector for purging the print data from the storage unit when data is received by the receiver.

The multi-functional device of the above constitution works as follows: when the storage unit holds any residual print data, the data ejector purges the print data from the storage unit if the device receives data over the communication line. Thus, the storage unit means never overflows with data. There is no possibility of the storage unit being exhausted in capacity and becoming incapable of receiving the currently arriving data or subsequent incoming data for any specific process to be carried out. There will be no reception error that would stop partially through the communication function of the multi-functional device.

According to a third aspect of the invention, the multi-functional device further comprises an ejection inhibitor for inhibiting the ejection, i.e., purging, of the print data from the storage unit if a predetermined period of time is yet to elapse since the print data was placed in the storage unit even where data for performing a predetermined process is being sent to the storage unit.

With this preferred structure, the residual print data in the storage unit will not be purged inadvertently without the user carrying out other desired tasks.

The predetermined period of time should preferably be set for approximately five minutes. The five-minute duration is preferred so as to allow for cases where it takes time for the user to manually replenish, as needed, the device with special paper on which to record the print data. The ejection inhibitor is implemented by the CPU carrying out a suitable program.

According to a fourth aspect of the invention, the signals received by the receiver are either fax data or voice signals.

With this preferred structure, it may happen that the receiver receives fax data over the communication line or that the multi-functional device using the so called answering phone function receives voice signals and turns them into voice data for storage into the storage unit. In such cases, the device can secure sufficient memory space in the storage unit to accommodate the fax data or voice data. Thus, the storage unit never overflows with data and no reception error occurs.

According to a fifth aspect of the invention, the multi-functional device further comprises a reader unit for reading images from a document and outputting image data, wherein the data for performing the predetermined process is either the print data sent from the data processor or the image data from the reader unit.

With this preferred structure, when the storage unit stores print data sent from the data processor or image data from the reader unit, the device can allocate sufficient memory space in the storage unit to accommodate the print data or the image data. This means that the storage unit never overflows with data. According to the user's instructions, the reader unit of the device reads images using the copy function or scanner function so that the image data thus obtained or the print data from the data processor will be printed onto the recording paper. The user will not be inconvenienced by an interruption of the device operation due to lack of memory space.

The image data read from a document by the reader unit may be one of two kinds: image data read from a document to be faxed, in particular, by a memory-buffered transmission feature or image data read from a document to be copied.

According to a sixth aspect of the invention, the data ejector purges the print data from the storage unit when the remaining capacity of the storage unit is below a predetermined level.

With this preferred structure, it is possible to determine whether to purge the print data from the storage unit depending on its remaining memory capacity. Illustratively, if the storage unit has enough capacity to receive signals sent over the communication line, the print data will not be purged automatically.

A predetermined threshold level of the memory capacity should preferably be set for a capacity slightly greater than that which is sufficient to accommodate the fax data being received while the residual print data is being purged from the storage unit.

According to a seventh aspect of the invention, the data ejector purges the print data from the storage unit when the receiver receives a signal.

With this preferred structure, there is no need to provide a detector for detecting the remaining memory capacity of the storage unit.

According to a eighth aspect of the invention, the data ejector purges the print data from the storage unit when a request is made to record data other than the residual print data in the storage unit upon elapse of a predetermined period of time since the print data was placed in the storage unit.

With this preferred structure, the print data is not purged from the storage unit automatically in an arrangement where the print data is to be printed onto special paper which is currently exhausted but is likely to be supplied manually within a short period of time. That is, as long as the user intends to replenish the exhausted special paper shortly, the print data will not be purged prematurely nor will it be printed on some other undesirable recording paper that happens to be available on the device.

The above predetermined period of time should preferably set for five minutes, the same period adopted by the third preferred structure described earlier. The request for recording may be intended not only for the print data sent from the data processor but also for image data read by the reading means from a document.

According to a ninth aspect of the invention, the ejection, i.e., purging, of the print data is carried out by recording the print data from the storage unit onto recording paper.

With this preferred structure, the print data is deleted only after it is printed onto the recording paper. Viewing the print-out, the user can verify the contents of the purged print data. This eliminates the possibility of inadvertently purging the storage unit without the user's knowledge that the print data is yet to be printed onto recording paper.

According to a tenth aspect of the invention, the ejection, i.e., purging, of the print data is carried out by automatically purging the print data from the storage unit.

This preferred structure is applied illustratively to the type of recording device which retains the last page of residual print data after printing the print data onto recording paper. The residual print data, now recorded and having outlasted its usefulness, is then removed automatically from the storage unit so that memory space is allocated to accommodate signals sent over the communication line or other print data.

According to a eleventh aspect of the invention, there is provided a storage medium for use with the multi-functional device comprising a receiver for receiving signals via a communication line, transceiver for transmitting and receiving data to and from a data processor, and a storage unit for storing the signals received by the receiver as well as the data received by the transceiver. The storage medium includes a data ejection program for purging any print data from the storage unit either when a signal is received by the transceiver or when data for performing a predetermined process is sent to the storage unit.

The contents of the above storage medium cause the CPU of the connected multi-functional device to function, offering the same effects as those provided by the multi-functional device according to the first aspect of the invention.

Illustratively, the storage medium may be a ROM, a flexible disk, a CD-ROM or other memory devices.

According to a twelfth aspect of the invention, there is provided a storage medium for use with a multi-functional device comprising a receiver for receiving data via a communication line, a transceiver for transmitting and receiving data to and from a data processor, and a storage unit for storing the data received by the receiver as well as print data received by the transceiver. The storage medium includes a data ejection program for purging the print data from the storage unit when data is received by the receiver.

The contents of the above storage medium cause the CPU of the connected multi-functional device to function, offering the same effects as those provided by the multi-functional device according to the second aspect of the invention.

These and other objects, features and advantages of the invention will become more apparent from reading the following description and appended drawings.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Figure 1:
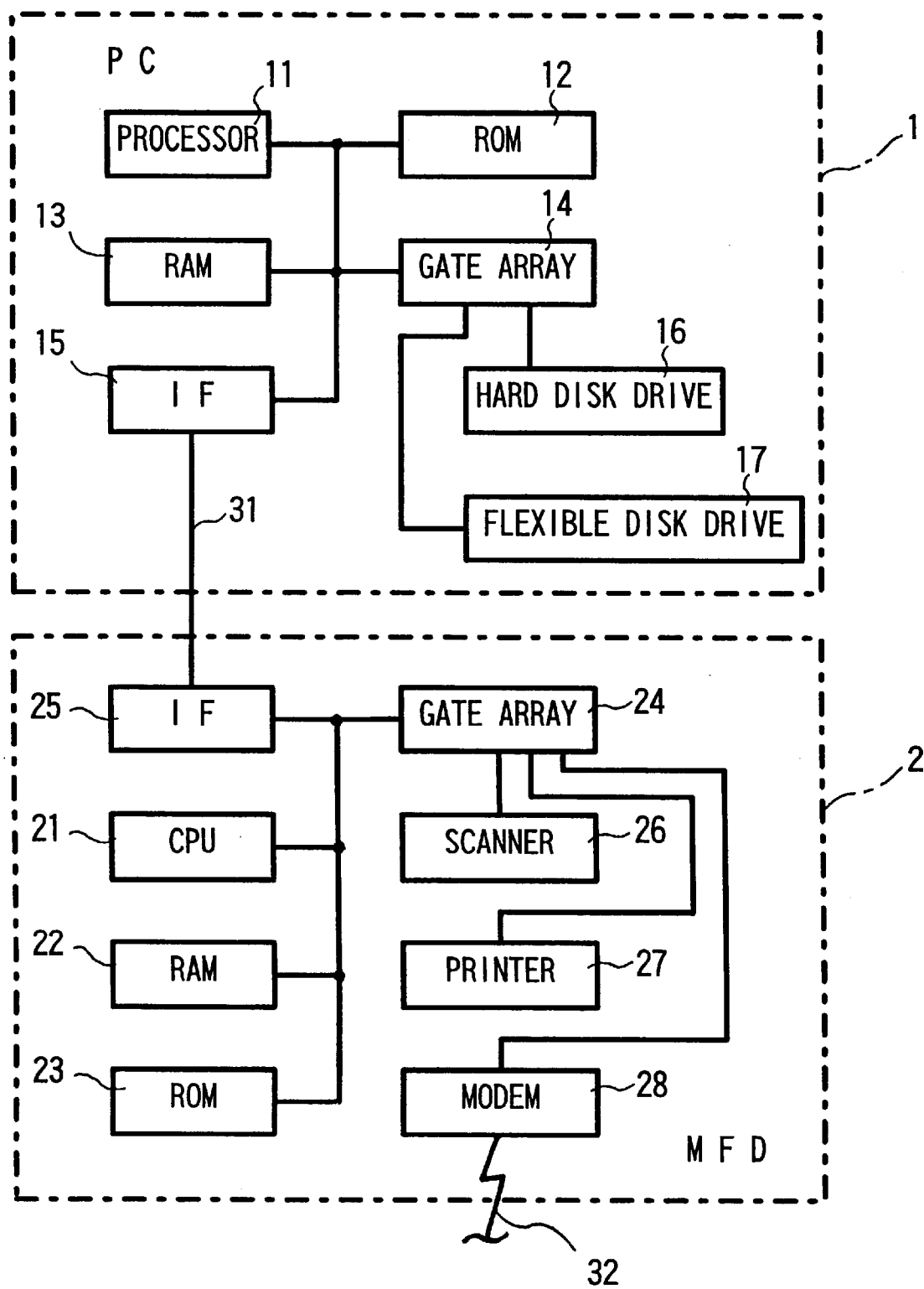
FIG. 1 is a circuit block diagram of a multi-functional device embodying the invention and connected to a personal computer used as a data processor.

FIG. 1 is a circuit block diagram of a multi-functional device 2 embodying the invention and connected to a personal computer 1 (i.e., a "PC") used as a data processor. The personal computer 1 adopts the so-called GUI (Graphic User Interface) scheme utilizing multiple windows in which a plurality of application programs are simultaneously activated. The multi-functional device 2 (abbreviated and referred to hereafter as the "MFD") has a plurality of functions including a facsimile function, a printer function, an image scanner function and a copy function.

The personal computer 1 comprises a processor 11, a ROM 12, a RAM 13, a gate array 14, an interface 15 (IF), a hard disk drive 16 and a flexible disk drive 17. The processor 11, the ROM 12, the RAM 13, the gate array 14 and the interface 15 are interconnected by bus lines as indicated by solid lines. The bus lines include a data bus, an address bus and a control signal line.

The processor 11 performs data processing under control of an operating system and diverse application programs installed in the hard disk drive 16. The ROM 12 contains various data. The RAM 13 is used by the application programs to store assorted data. The gate array 14 functions as an interface between the processor 11 on one hand and the hard disk drive 16 and flexible disk drive 17 on the other hand. The interface 15 controls data exchanges between the personal computer 1 and the MFD 2 illustratively in accordance with RS-232C standards. The hard disk drive 16 accommodates diverse application programs. The flexible disk drive 17 reads out the contents of a flexible disk loaded therein.

The MFD 2 comprises a CPU 21, a RAM 22, a ROM 23, a gate array 24, an interface 25, a scanner 26, a printer 27 and a modem 28. The CPU 21, the RAM 22, the ROM 23, the gate array 24 and the interface 25 are interconnected by bus lines as indicated by solid lines. The bus lines include a data bus, an address bus and a control signal line. The interface 25 is connected via a cable 31 to the interface 15 of the personal computer 1. The modem 28 is connected to a telephone line 32.

The CPU 21 controls the MFD 2 as a whole. The RAM 22 stores various data. The ROM 23 retains programs which to control the MFD 2. The gate array 24 functions as an interface between the CPU 21 on one hand and the scanner 26, printer 27 and modem 28 on the other hand. The interface 25 controls data exchanges between the personal computer 1 and the MFD 2 illustratively in accordance with the RS-232C standards. The scanner 26 reads images from a document and converts them into image signals. The printer 27 prints images based on image data. For transmission and reception of facsimile communications, the modem 28 modulates carrier by the data to be transmitted and demodulates the modulated carrier to retrieve data therefrom.

Various MFD control application programs are installed on the hard disk drive 16 of the personal computer 1. These application programs are intended to implement such functions as performing facsimile communications between the personal computer 1 and another facsimile machine via the modem 28 of the MFD 2, causing the printer 27 to print documents or images prepared by the personal computer 1, and loading into the personal computer 1 the image signal read by the scanner 26. The MFD control application programs are installed onto the hard disk drive 16 from a flexible disk containing these programs and loaded on the flexible disk drive 17. With the appropriate disk inside, the flexible disk drive 17 is operated suitably for program installation onto the hard disk drive 16. The MFD control application software includes a program called a "fax driver" for converting text data to bit map data, a program called a "log manager" for managing and displaying communication logs and a program called a "status monitor" for managing data exchanges between the personal computer 1 and the MFD 2.

The CPU 21, the interface 25 and the cable 31 form a transceiver for exchanging data between the personal computer 1 and the MFD 2. The RAM 22 constitutes a storage unit for storing signals received by a receiver as well as print data received by the transceiver. The CPU 21 and ROM 23 make up either a data ejector or an ejection inhibitor. On one hand, when the receiver receives a signal or when data for performing a predetermined process is sent to the storage unit while the storage unit still retains print data, the CPU 21 and the ROM 23 act as the data ejector to purge remaining print data from the storage unit. On the other hand, when data for performing a predetermined process is sent to the storage unit, the CPU 21 and the ROM 23 act as the ejection inhibitor to inhibit the ejection, i.e., purging, of any print data from the storage unit if a predetermined period of time is yet to elapse since the print data was placed in the storage unit. The CPU 21 and the scanner 26 constitute a reader unit for reading images from a document and outputting the image data.

The multi-functional device (MFD) 2 of the above constitution works generally as follows. When a signal is received over the communication line, the CPU 21 checks to see if any print data remains in the RAM 22. If the CPU 21 finds print data in the RAM 22, the CPU 21 checks the remaining memory capacity of the RAM 22. If the CPU 21 finds that the remaining memory capacity is below a predetermined level, i.e., that the memory capacity is not sufficient to accommodate the received signal into the RAM 22, the CPU 21 purges the remaining print data from the RAM 22 by recording the data onto recording paper. The RAM 22 is thus evacuated to secure enough memory space to store the received signal.

When a request is made to record data, the CPU 21 likewise checks to see if any print data remains in the RAM 22. If the CPU 21 finds any print data in the RAM 22, the CPU 21 then checks to see whether a predetermined period of time has elapsed since the print data was placed in the RAM 22. If the predetermined time is found to have elapsed, the CPU 21 prints the remaining print data from the RAM 22 onto recording paper. At this point, the print operation takes place either onto desired recording paper or onto other available paper if the desired paper is exhausted and/or unavailable. The RAM 22 is thus evacuated to allocate enough memory space to accommodate new print data. Furthermore, if the CPU 21 determines that the newly received print data can be printed onto recording paper, the print operation of the new print data is allowed to take place.

Figure 2:
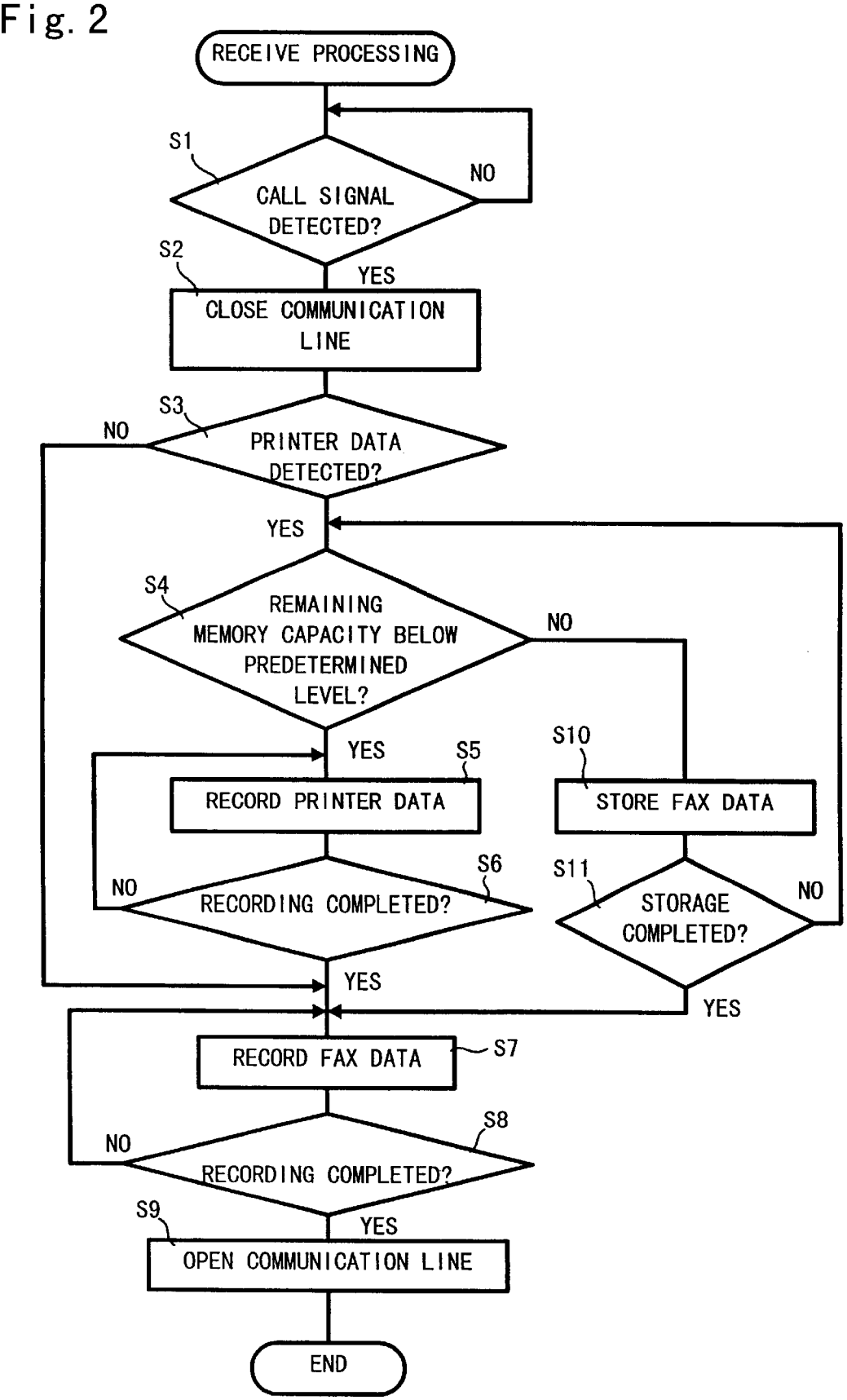
FIG. 2 is a flowchart of steps in which the embodiment of FIG. 1 operates for fax receive processing.

Described below with reference to the flowchart of FIG. 2 is how the MFD 2 of FIG. 1 receives fax data.

In step S1, the CPU 21 checks to see if a call signal is sent from a terminal over the telephone line 32. If no call signal is found ("NO" in step S1), the CPU 21 repeats step S1 until a call signal arrives ("YES" in step S1).

If the CPU 21 finds in step S1 that a call signal has arrived, the CPU 21 closes the telephone line 32 in step S2. In step S3, the CPU 21 checks to see if any print data remains in the RAM 22. Print data includes text data prepared by a word processor or by wordprocessor software and comprises text and images as well as image data and copy data read in by the scanner.

If the CPU 21 detects any print data remaining in the RAM 22 ("YES" in step S3), the CPU 21 checks the remaining memory capacity of the RAM 22 in step S4. Verifying the available memory capacity in step S4 can make it unnecessary to purge the remaining print data automatically, since all fax data received may be accommodated without outputting and purging the residual data depending on the remaining memory capacity of the RAM 22.

If the CPU 21 finds the remaining memory capacity of the RAM 22 to be lower than a predetermined level ("YES" in step S4), the currently remaining capacity is not sufficient to receive fax data. In this case, the print data is printed onto recording paper in step S5 before removal of the data from the RAM 22 so that enough memory space is allocated in the RAM 22 to accommodate the received fax data. The predetermined threshold level of the memory should preferably be set for a capacity slightly greater than that which is sufficient to admit fax data while the residual print data is being purged from the storage unit.

In step S6, the CPU 21 checks to see if printing-out of the print data onto recording paper has ended. If the CPU 21 determines that printing-out of all residual print data is yet to be complete ("NO" in step S6), step S5 is repeated and printing-out of the print data onto recording paper is resumed and continued until the data is exhausted.

If the CPU 21 determines that printing-out of all residual print data onto recording paper has ended ("YES" in step S6), the print data is purged from the RAM 22 to allocate memory space for receiving the fax data. In step S7, the fax data is received into memory.

As described, the above multi-functional device embodying the invention purges residual print data from the RAM 22 when the remaining capacity of the RAM is found to be below a predetermined level. This arrangement keeps a sufficient memory capacity secured in the RAM 22, and no reception error is triggered by lack of memory space.

In step S8, the CPU 21 checks to see if all fax data that it has received has been recorded. If the CPU 21 finds that recording of all received fax data is yet to be complete ("NO" in step S8), step S7 is repeated and recording of the fax data is resumed and continued until all fax data is recorded.

If the CPU 21 determines that recording of all fax data received by the CPU is complete ("YES" in step S8), the telephone line 32 is opened in step 9. The receive processing routine is then terminated.

If the CPU 21 determines in step S3 that no print data remains in the RAM ("NO" in step S3), that means the RAM 22 has a sufficient memory space to accommodate fax data. In that case, step S7 is executed in which the fax data is printed onto recording paper. All subsequently received fax data is printed onto recording paper. When recording of the fax data is completed ("YES" in step S8), the telephone line 32 is opened in step S9. The receive processing routine is then terminated.

If the CPU 21 determines in step S4 that the RAM 22 has a remaining memory capacity greater than the predetermined level ("NO" in step S4), step S10 is then executed. In step S10, the CPU 21 places the fax data temporarily in an available internal storage area of the RAM 22.

In step S11, the CPU 21 checks to see if all fax data it received has been stored into the RAM 22. If the CPU 21 determines that storage of all fax data it received is completed ("YES" in step S11), all fax data placed into the available memory area is now stored therein. In this case, step S7 is then executed in which the fax data is printed onto recording paper. All subsequently received fax data is printed onto recording paper. When recording of the fax data is completed ("YES" in step S8), the telephone line 32 is opened in step S9. The receive processing routine is then terminated.

In step S11, the CPU 21 may find that not all fax data it received has been stored ("NO" in step S11). In this case, step S4 is repeated. Storage of the fax data is resumed and continued until the CPU 21 determines the remaining capacity of the RAM 22 to be lower than the predetermined level ("YES" in step S4), or until the CPU 21 finds that storage of all fax data it received is completed.

In the above-described embodiment, whether to purge residual print data from the RAM 22 is determined according to the remaining capacity of the RAM 22 to receive fax data. Alternatively, any residual print data may be purged from the RAM 22 at the moment fax data is received.

The above-described embodiment applies mainly to the type of multi-functional device which deletes print data from the RAM 22 once the print data has been recorded. As such, the embodiment purges print data from its memory after the data is printed onto recording paper. In a multi-functional device wherein print data remains in the RAM 22 even at the end of print data recording, printing the print data onto recording paper is a waste of paper resources. In this case, the print data may be automatically deleted from the RAM 22 without recording the data onto paper.

Figure 3:
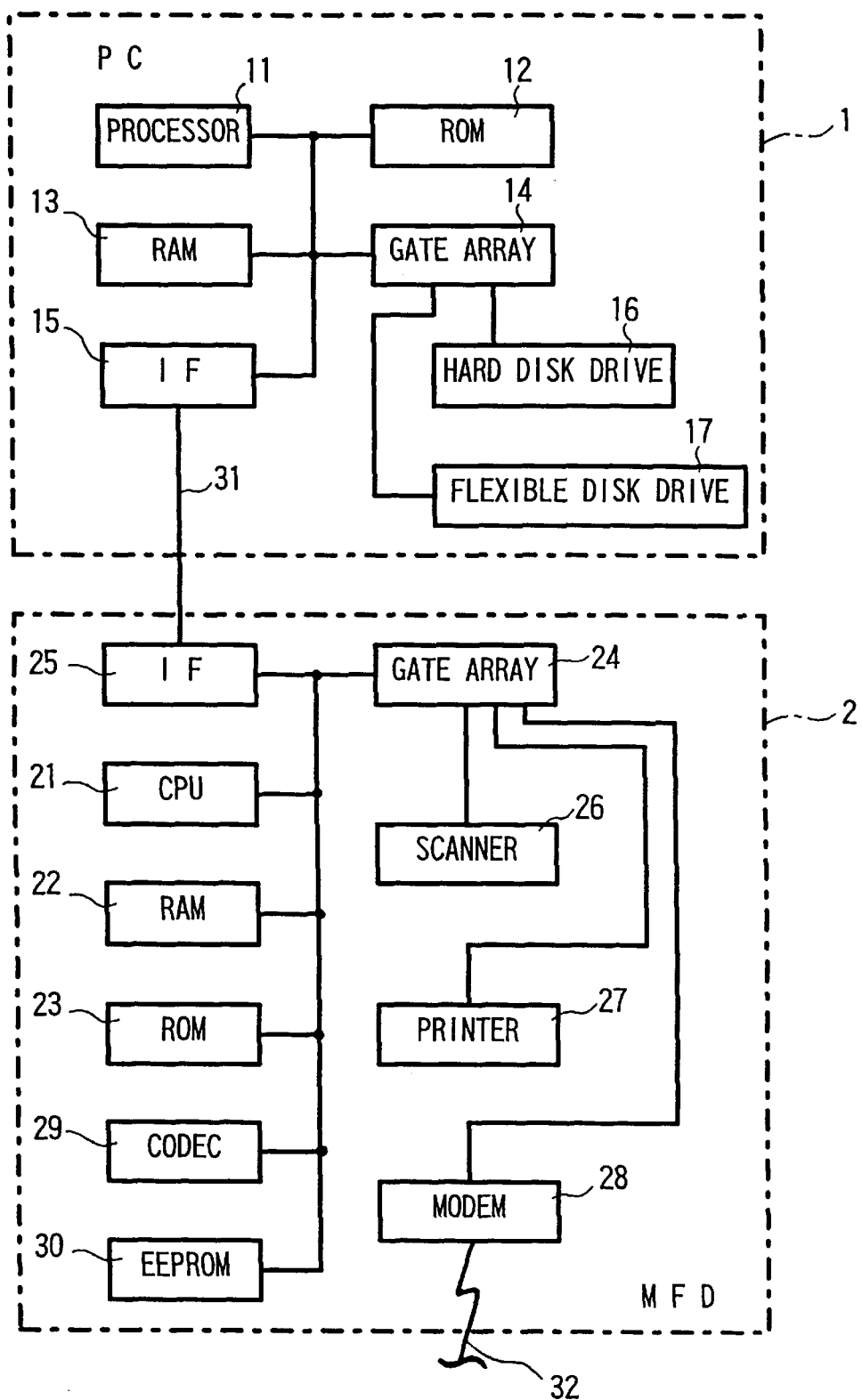
FIG. 3 is a circuit block diagram of another multi-functional device also embodying the invention and connected to a personal computer used as a data processor.

FIG. 3 is a circuit block diagram of another multi-functional device also embodying the invention and connected to a personal computer used as a data processor. The embodiment of FIG. 3 differs from that of FIG. 1 in that the MFD 2 in FIG. 3 is supplemented by a codec 29 and an EEPROM 30. The codec 29 (commonly known as a "coder and decoder") and EEPROM 30, together with the CPU 21, the RAM 22, the ROM 23, the gate array 24 and the interface 25, are interconnected by bus lines as shown by the solid lines. The codec 29 encodes and decodes fax data and converts voice signals to voice data and vice versa. For example, when the MFD 2 receives a voice signal over the telephone line 32, the received voice signal which is an analog signal needs to be converted to digital format. Here, the codec 29 serves to convert the received voice signal to a digital signal (i.e., voice data). The EEPROM 30 has various flags and telephone numbers stored therein.

Below is a brief description of how the MFD 2 in FIG. 3 receives a voice signal. The steps involved are basically the same as those constituting the fax data reception process already described. The difference is that whereas the embodiment of FIG. 1 has fax data stored into the RAM 22 of the MFD 2 in step S10, the embodiment of FIG. 3 has the received voice signal converted to voice data by the codec 29 before storing the converted data into the RAM 22.

Figure 4:
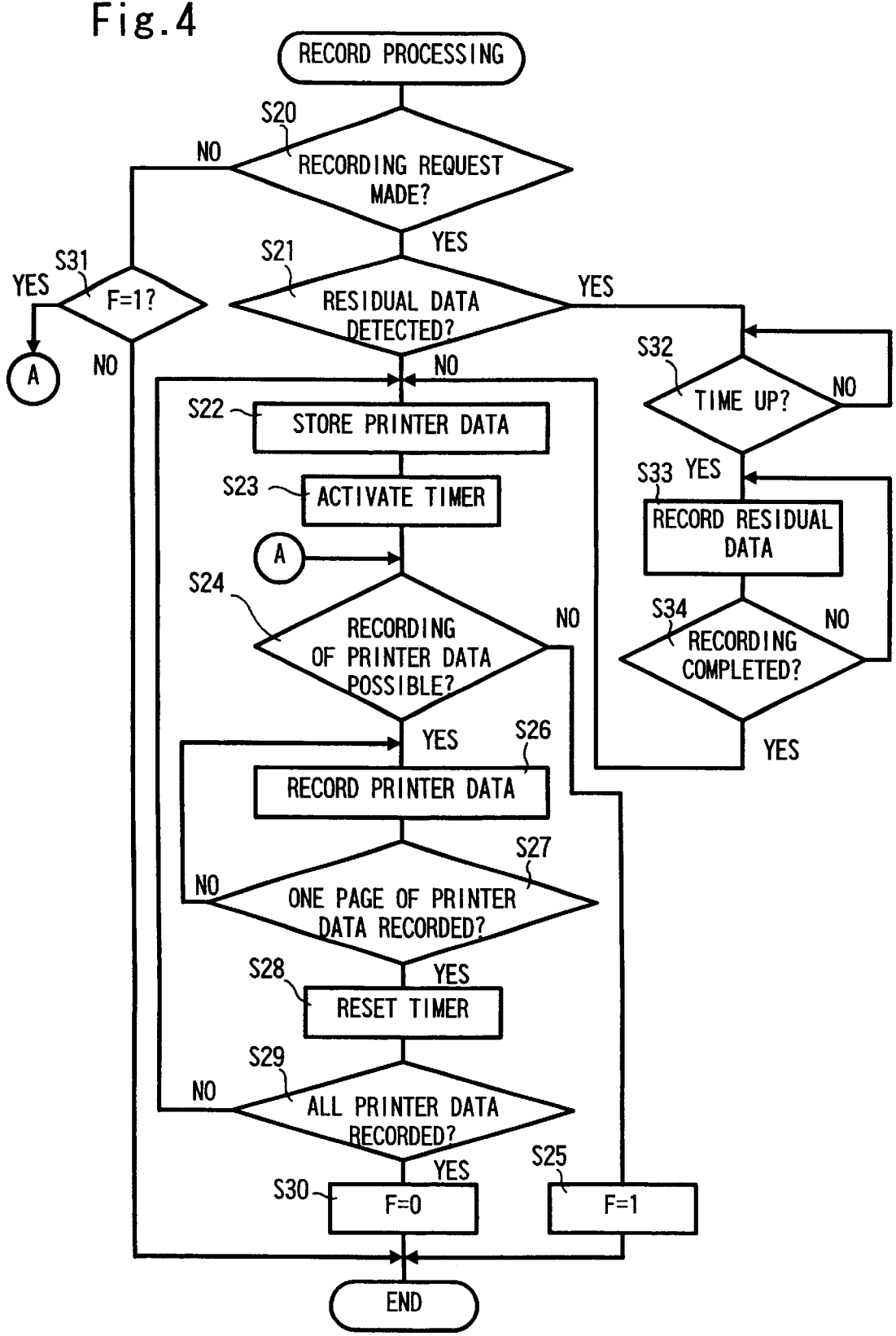
FIG. 4 is a flowchart of steps in which the embodiment of FIG. 3 operates for record processing.

How print data is recorded by the MFD 2 in FIG. 3 will now be described with reference to the flowchart of FIG. 4.

In step S20, the CPU 21 checks to see if a user has made a request to record data. If the CPU 21 determines that the user has made the request ("YES" in step S20), step S21 is then executed. In step S21, the CPU 21 checks to see if any print data remains in the RAM 22. That is, the CPU 21 checks to see if the RAM 22 has enough memory capacity to accommodate the newly incoming print data. Print data includes text data prepared by a word processor or by word-processor software and comprises text and images as well as image data and copy data read in by the scanner. The request for recording may be intended not only for the print data sent from the data processor but also for image data read by the reader unit from a document.

If the CPU 21 determines that no print data remains in the RAM 22 ("NO" in step S21), step S22 is then executed. In step S22, one page of the print data to be recorded onto recording paper is stored. In step S23, a timer is activated by the CPU 21 executing an appropriate program held in the ROM 23. The timer may be of a count-down type. Illustratively, an integer variable N is set in a register and decremented by 1 at a time in synchronism with a clock signal of a predetermined cycle. When the variable N has reached 0, time is up on the timer.

In step S24, the CPU 21 checks to see if the print data in the RAM 22 may be printed onto recording paper. If the CPU 21 determines that the print data may not be printed onto recording paper ("NO" in step S24), step S25 is executed in which a flag F is set to 1 and stored in the EEPROM 30. The record processing routine is then terminated. The next time a request is made for recording data, the CPU 21 will check the flag F to see if any print data remains in the RAM 22. When the CPU 21 determines in step S24 that it is impossible to record the print data, that typically means the absence of recording paper (special recording paper in particular) to be fed manually to record print data thereon.

If the CPU 21 determines in step S24 that the print data in the RAM 22 may be printed onto recording paper ("YES" in step S24), step S26 is executed in which the stored print data is printed onto recording paper. In step S27, the CPU 21 checks to see if one page of print data in the RAM 22 has been completely printed onto recording paper.

If the CPU 21 determines that printing-out of the single-page print data in the RAM 22 has not been completed on recording paper ("NO" in step S27), the CPU 21 repeats steps S26 and S27 until printing-out of the stored single-page data is completed on recording paper. When the CPU 21 determines that the entire single-page print data in the RAM 22 has been printed onto recording paper ("YES" in step S27), step S28 is executed in which the timer activated in step S23 is reset.

In step S29, the CPU 21 checks to see if all print data has been printed onto recording paper, i.e., if the print data just printed onto recording paper is the last page of the print data to be recorded. If the CPU 21 determines that printing-out of all print data to be recorded is not completed on recording paper ("NO" in step S29), step S22 is repeated. The CPU 21 then processes the next page of print data in the manner described starting from step S22. The process is repeated until the CPU 21 determines in step S29 that all print data to be recorded has been printed onto recording paper, or until the CPU 21 determines in step S24 that no further data in the RAM 22 can be printed onto recording paper.

When the CPU 21 finds in step S29 that all print data to be recorded has been printed onto recording paper ("YES" in step S29), step S30 is executed. In step S30, the CPU 21 sets the flag F to 0 and stores the flag in the EEPROM 30.

When the CPU 21 determines in step S20 that no request has been made by the user ("NO" in step 20), step S31 is executed. In step S31, the CPU 21 checks to see if the flag F in the EEPROM 30 is 1. If the CPU 21 finds the flag F to be 1 ("YES" in step S31), step S24 is executed. The fact that the CPU 21 finds the flag F in the EEPROM 30 to be 1 means the presence of residual print data in the RAM 22. Assuming that the cause having previously hampered the print data in the RAM 22 from being printed onto recording paper has been resolved, the CPU 21 again checks to see if the residual print data may now be printed onto recording paper. If printing-out of the residual print data is found to be feasible, the data is now printed onto recording paper. Illustratively, the absence of manually supplied recording paper may have kept the print data in the RAM 22 from being recorded. With recording paper subsequently replenished, printing-out of the residual print data will be found possible when checked by the CPU 21 the next time.

If the CPU 21 determines in step S21 that any print data remains in the RAM 22 ("YES" in step S21), the CPU 21 checks to see in step S32 if time is up on the timer, i.e., if a predetermined period of time has elapsed since the print data was placed in the RAM 22. The predetermined time period should preferably be set for about five minutes.

If the CPU 21 finds that time is not up yet ("NO" in step S32), step S32 is repeated until a time-up state is reached. When the CPU 21 determines in step S32 that time is up, i.e., that the predetermined time period has elapsed since the print data was placed in the RAM 22 ("YES" in step S32), the residual print data in the RAM 22 is printed onto recording paper in step S33. At this point, if the residual print data is desired to be printed on specific recording paper and if such paper is not immediately available, the print data will be printed onto currently available paper provided on the MFD 2.

In step S34, the CPU 21 checks to see if all remaining print data in the RAM 22 has been printed onto recording paper. If the CPU 21 determines that not all remaining print data has been recorded on paper ("NO" in step 34), steps S33 and S34 are repeated until the CPU 21 finds that all residual print data in the RAM 22 has been printed onto recording paper.

If the CPU 21 determines in step S34 that all remaining print data in the RAM 22 has been printed onto recording paper ("YES" in step S34), step S22 is executed in which the print data requested to be recorded anew is processed. If the CPU 21 determines in step S24 that it is not possible to print the print data to be recorded anew onto recording paper ("NO" in step S24), the CPU 21 sets the flag F to 1, stores the flag into the EEPROM 30, and terminates the routine. The routine is also terminated if the CPU 21 finds in step S29 that printing-out of the print data to be recorded anew onto recording paper has ended or if the CPU 21 determines in step S24 that printing-out of the print data to be recorded anew onto recording paper is not possible.

The embodiment of FIG. 3 also applies mainly to the type of multi-functional device which deletes print data from the RAM 22 once the print data has been recorded. As such, the embodiment purges print data from its memory after the data is printed onto recording paper. In a multi-functional device wherein print data remains in the RAM 22 even at the end of print data recording, printing the print data onto recording paper is a waste of paper resources. In this case, the print data may be automatically deleted from the RAM 22 without recording the data onto paper.

How the MFD 2 in FIG. 3 performs a copy operation is described briefly below. The steps involved are basically the same as those constituting the record processing routine in FIG. 4. One difference is that whereas the embodiment for record processing has the CPU 21 judging whether a recording request has been made in step S20, the CPU 21 for copy processing checks to see if a copy request has been made. Another difference is that whereas the embodiment for record processing has the CPU 21 placing into the RAM 22 newly incoming data from the personal computer 1, the CPU 21 for copy processing causes the scanner 26 to read images from a document and to store the acquired image data into the RAM 22.

Illustratively, in copy processing by the MFD 2 in FIG. 2, a copy request may be issued while print data still remains in the RAM 22. In that case, the CPU 21 may check the RAM 22 to determine if the remaining memory capacity is below a predetermined level. If the remaining capacity of the RAM 22 is found to be below the predetermined level, the CPU 21 may purge the residual print data from the RAM 22. If the remaining memory capacity is determined to be above the predetermined level, the CPU 21 may leave the print data intact in the RAM 22.

What is claimed is:

1. A multi-functional device adapted for use with an external data processing device, the multi-functional device interposed between an external data processing device and a communication line, the multi-functional device comprising:

reception means for receiving information via the communication line;

transmitter-receiver means for transmitting and receiving data, including print data, to and from the external data processing device;

storage means for storing the information received by the reception means as well as the data received by the transmitter-receiver means;

means for detecting whether print data is stored in the storage means;

means for determining whether a predetermined threshold amount of memory is available in the storage means when the means for detecting detects that print data is stored in the storage means;

data ejection means for purging any print data from the storage means only when the means for determining determines that the predetermined amount of memory is not available in the storage means and either a predetermined signal is received by the reception means or data for performing a predetermined process is sent to the storage means; and ejection inhibiting means for inhibiting the data ejection means from purging the print data from the storage means if a predetermined period of time is yet to elapse since the print data was placed in the storage means even when data is being sent to the storage means and the predetermined amount of memory is not available, and for allowing the data ejection means to purge the print data from the storage means if the predetermined of time has elapsed since the print data was placed in the storage means when data is being sent to the storage means and the predetermined amount of memory is not available.

2. A multi-functional device according to claim 1, wherein the data ejection means purges print data from the storage means when a remaining capacity of the storage means is below a predetermined level.

3. A multi-functional device according to claim 1, wherein the data ejection means purges print data by recording the print data from the storage means onto recording paper.

4. A multi-functional device according to claim 1, wherein the data ejection means purges print data by automatically deleting the print data from the storage means.

5. A multi-functional device according to claim 1, wherein the information received by the reception means is either fax data or voice signals.

6. A multi-functional device according to claim 1, further comprising reading means for reading images from a document and outputting image data, wherein the data for performing the predetermined process is either print data sent from the external data processing device or the image data from the reading means.

7. A multi-functional device according to claim 1, wherein the data ejection means purges print data from the storage means when a signal is received representing a request to record data other than residual print data in the storage means upon elapse of a predetermined period of time since the print data was placed in the storage means.

8. A data storage system adapted for use with a multi-functional data processing device, and a printer that prints print data, the data storage system capable of sending print data to the printer, comprising:

a storage medium with a storage capacity that stores data including input print data;

a signal receiving mechanism stored in the storage medium that receives signals corresponding to the input print data;

a data ejecting mechanism stored in the storage medium that manipulates the stored input print data based upon signals received by the signal receiving mechanism to control the amount of input print data stored in the storage medium so that dated input print data is selectively purged from the storage medium to permit storage of current input print data only when the storage medium has less than a predetermined remaining storage capacity; and an ejection inhibitor operative to inhibit the data ejecting mechanism from purging the dated print data from the storage device to the printer until a predetermined period of time lapses from when the dated input print data was placed in the storage medium regardless of the remaining storage capacity of the storage medium so that the dated print data would not be printed out by the printer, and to permit the data ejecting mechanism from purging the dated print data from the storage medium to the printer after a predetermined period of time has elapsed.

9. A data storage system according to claim 8, wherein the signals received by the signal receiving mechanism causes the data ejecting mechanism to purge at least a portion of the input print data stored in the storage medium.

10. A data storage system according to claim 9, wherein the data ejecting mechanism purges the input print data by one of recording the print data onto a recording medium or deleting the print data from the storage medium.

11. A data storage system according to claim 9, wherein the data ejecting mechanism purges the input print data after a predetermined period of time elapses from when the signal receiving mechanism receives a signal.

12. A data storage system according to claim 9, wherein the signal receiving mechanism receives signals representative of a request to record data other than input print data and, when the request is received, the data ejecting mechanism purges the input print data based upon a predetermined period of time since the input print data was stored in the storage medium.

13. A multi-functional device adapted for use with a data processor, comprising:

an interface device operative for exchanging internal data including print data between the data processor and the multi-functional device;

a receiver for receiving external data including print data from external data sources in addition to the internal data from the data processor;

a storage device having a memory space for storing internal data received from the data processor and external data received from the external data sources;

a detector that detects whether print data is stored in the storage device;

a determining device that determines whether a predetermined amount of memory is available in the storage device when the detector detects that print data is stored in the storage device, the predetermined amount of memory being equal to or greater than an amount of memory required to accommodate newly-arriving external data or internal data or to execute a predetermined process; and a data ejector that purges print data from the storage device only when the determining device determines that the predetermined amount of memory is not available in the storage device so as to facilitate storing the newly-arriving external data or the internal data or to facilitate executing the predetermined process, and that does not purge print data from the data storage device when the determining device determines that the predetermined amount of memory is available in the storage device so as to faciliate storing the newly-arriving external data to the internal data or to facilitate executing the predetermined process.

14. A multi-functional device according to claim 13, wherein the data ejector and the receiver are coupled to the storage device to manipulate the stored print data based upon signals received by the receiver to control the amount of print data stored in the storage device.

15. A multi-functional device according to claim 13, wherein, when the data ejector purges the storage device of print data, the print data is either recorded onto a recording paper or erased from the storage device.

16. A multi-functional device according to claim 13, wherein the external data includes at least one of fax data and voice data.

17. A multi-functional device according to claim 13, further comprising a reader unit operative to read images from a document and to output image data wherein processing data for executing the predetermined process is either internal data transmitted by the data processor or image data transmitted by the reader unit.

18. A multi-functional device according to claim 13, wherein the data ejector purges dated print data from the storage device based upon a signal received by the multi-functional device representing a request to store incoming data whereby the dated print data is determined based upon a predetermined expiry period of time measured from when the print data was first stored in the storage device relative to when the signal is received.

19. A method of purging data from a data storage device, comprising the steps of:

providing a storage device having a memory space for storing data including print data;

determining that newly-arriving data is required to be stored in the storage device;

detecting whether print data is stored in the storage device;

determining, when it is detected that print data is stored in the storage device, that an insufficient predetermined amount of memory space is available in the storage device to accommodate the newly-arriving external data;

purging print data from the storage device only when it is determined that the predetermined insufficient amount of memory space is available in the storage device to facilitate storing the newly-arriving data wherein the step of purging print data occurs when the print data being purged is either recorded onto a recording paper or erased from the data storage device; and inhibiting purging of dated print data from the storage device to a printer until a predetermined period of time lapses from when the dated print data was placed in the storage device regardless of the remaining storage capacity of the storage device so that the dated print data would not be printed out by the printer, and to permit the purging of the dated print data from the storage medium to the printer after a predetermined period of time has elapsed.

20. A method according to claim 19, wherein the print data purged is dated print data whereby the dated print data is determined based upon a predetermined expiry period of time measured from when the print data was first stored in the storage device relative to when the step of purging is required.

21. A multi-functional device according to claim 1, wherein the data ejection means does not purge the print data from the storage means when the means for determining determines that the predetermined amount of memory is available in the storage means.

22. A multi-function device, including a printer, adapted for use with an external data processing device, the multi-function device interposed between an external data processing device and a communication line, the multi-function device comprising:

first reception means for receiving information via the communication line;

second reception means for receiving data, including print data, from the external data processing device;

storage means for storing the information received by the first reception means as well as the data received by the second reception means;

means for detecting whether remaining data is stored in the storage means;

data ejection means for purging remaining data from the storage means either when a predetermined signal is received by one of the first reception means and the second reception means or when data for performing a predetermined process is sent to the storage means; and ejection inhibiting means for inhibiting the purging of the remaining data from the storage means to the printer by sending the remaining data if a predetermined period of time is yet to elapse since the remaining data was placed in the storage means, and for permitting the purging of the remaining data from the storage means to the printer by sending the remaining data if a predetermined period of time has already elapsed since the remaining data was placed in the storage means, wherein the ejection inhibiting means has priority over the data ejection means.

23. The multi-function device according to claim 22, further comprising a printing means for printing the remaining data purged by the data ejection means from the storage means and for printing the information received by the first reception means and the data received by the second reception means on a recording medium.

24. A multi-function device adapted for use with an external data processing device, the multi-function device interposed between an external data processing device and a communication line, the multi-function device comprising:

first reception means for receiving information via the communication line;

second reception means for receiving data, including print data, from the external data processing device;

storage means for storing the information received by the first reception means as well as the data received by the second reception means;

means for detecting whether remaining data is stored in the storage means;

data ejection means for purging at least one of the remaining data, the information received by the first reception means, and the data received by the second reception means from the storage means; and control means for controlling the data ejection means under a predetermined condition to purge the information received by the first reception means or the data received by the second reception means without purging the remaining data stored in the storage means.

25. The multi-function device according to claim 24, further comprising a printing means for printing the remaining data purged by the data ejection means from the storage means and for printing the information received by the first reception means or the data received by the second reception on a recording medium.

26. The multi-function device according to claim 24, further comprising a means for determining whether a predetermined threshold amount of memory is available in the storage means when the means for detecting detects remaining data stored in the storage means, wherein the predetermined condition comprises the predetermined threshold amount of memory available in the storage means when the means for detecting detects remaining data stored in the storage means.

27. A multi-function device, including a printer, adapted for use with an external data processing device, the multi-function device comprising:

reception means for receiving data, including print data, from the external data processing device;

storage means for storing the data received by the reception means;

means for detecting whether remaining data is stored in the storage means;

data ejection means for purging remaining data from the storage means either when a predetermined signal is received by the reception means or when data for performing a predetermined process is sent to the storage means; and ejection inhibiting means for inhibiting the purging of the remaining data from the storage means to the printer by sending the remaining data if a predetermined period of time is yet to elapse since the remaining data was placed in the storage means, and for permitting the purging of the remaining data from the storage means to the printer by sending the remaining data if a predetermined period of time has already elapsed since the remaining data was placed in the storage means, wherein the ejection inhibiting means has priority over the data ejection means.

28. A communication system communicating with an external communication device having a communication line, the communication system comprising:

reception means for receiving information via the communication line from the external communication device;

storage means for storing the information received by the reception means;

means for detecting whether remaining data is stored in the storage means;

data ejection means for purging remaining data and the stored information from the storage means; and control means for controlling the data ejection means under a predetermined condition to purge the information received by the reception means without purging the remaining data stored in the storage means.

29. The communication system according to claim 28, further comprising means for determining whether a predetermined threshold amount of memory is available in the storage means when the means for detecting detects remaining data stored in the storage means, wherein the predetermined condition comprises the predetermined threshold amount of memory available in the storage means when the means for detecting detects the remaining data stored in the storage means.

30. A multi-functional device adapted for use with an external data processing device, the multi-functional device interposed between an external data processing device and a communication line, the multi-functional device comprising:

reception means for receiving information via the communication line;

transmitter-receiver means for transmitting and receiving data, including print data, to and from the external data processing device;

storage means for storing the information received by the reception means as well as the data received by the transmitter-receiver means;

status determining means for determining whether the storage means is in a predetermined status;

inhibiting means for inhibiting the control means from printing the print data from the storage means if a predetermined period of time is yet to elapse since the print data was placed in the storage means even when a recording request has been made and the predetermined amount of memory is not available; and control means for printing the print data on a first recording material which is different from a second recording material, the second recording material being specified to record the print data thereon if the status determining means determines that the storage means is in the predetermined status, wherein the inhibiting means allows the control means to print the print data from the storage means if the predetermined of time has elapsed since the print data was placed in the storage means when the recording request has been made and the predetermined amount of memory is not available.

31. The multi-functional device according to claim 30, wherein the status determining means determines whether the storage means is in the predetermined status either when a predetermined signal is received by the reception means or data for performing a predetermined process is sent to the storage means.

32. The multi-functional device according to claim 31, wherein the status determining means includes remaining data detecting means for detecting whether remaining data is stored in the storage means.

33. The multi-functional device according to claim 32, wherein the status determining means farther includes amount determining means for determining whether a predetermined threshold amount of memory is available in the storage means.

34. The multi-functional device according to claim 33, wherein the status determining means determines the storing device is in the predetermined status when the remaining data detecting means detects that remaining data is stored in the storage means and the amount determining means determines that the predetermined threshold amount of memory is not available in the storage means.

35. The multi-functional device according to claim 34, wherein the second recording material is manually replenished thereto.

36. A multi-functional device adapted for use with an external data processing device, the multi-functional device interposed between an external data processing device and a communication line, the multi-functional device comprising:

reception means for receiving information via the communication line;

transmitter-receiver means for transmitting and receiving data, including print data, to and from the external data processing device;

storage means for storing the information received by the reception means as well as the data received by the transmitter-receiver means;

status determining means for determining whether the storage means is in a predetermined status, the status determining means comprising:

remaining data detecting means for detecting whether remaining data is stored in the storage means; and amount determining means for determining whether a predetermined threshold amount of memory is available in the storage means, wherein the status determining means determines the storing device is in the predetermined status when the remaining data detecting means detects that remaining data is stored in the storage means and the amount determining means determines that the predetermined threshold amount of memory is not available in the storage means;

a first supplying means for supplying a recording material;

a second supplying means for supplying another recording material which is manually replenished thereto; and control means for printing the print data on the recording material which is supplied from the first supplying means even if the second supplying means is specified to supply said another recording material when the status determining means determines that the storage means is in the predetermined status.

37. The multi-functional device according to claim 36, wherein the status determining means determines whether the storage means is in the predetermined status either when a predetermined signal is received by the reception means or data for performing a predetermined process is sent to the storage means.

38. A multi-functional device adapted for use with an external data processing device and a printer, the printer capable of printing data on a first recording material or a second recording material which is different from the first recording material, the multi-functional device comprising:

reception means for receiving data, including a specified print data which is designated to be printed on the second recording material, from the external data processing device;

storage means for storing at least data received by the reception means;

timer means for checking the time since the specified print data was placed in the storage means;

control means for controlling the printer to print the specified print data on the first recording material or the second recording material by sending the specified print data to the printer; and inhibiting means for inhibiting the control means from printing the specified print data by the printer if a predetermined period of time is yet to elapse since the specified print data was placed in the storage means even when another recording request which has no relationship with the specified print data has been made, and for allowing the control means to print the specified print data on the second recording material by the printer if the predetermined period of time has elapsed since the specified print data was placed in the storage means when said another recording request has been made.

39. The multi-functional device according to claim 38, wherein said control means controls the printer so as to print the specified print data on the first recording material in case that the second recording material has not been prepared in the multi-functional device when said control means sends the specified print data to the printer.

40. A multi-functional device adapted for use with an external data processing device and a printer, the printer capable of printing data on a first recording material or a second recording material which is different from the first recording material, the multi-functional device comprising:

reception means for receiving data, including a specified print data which is designated to be printed on the second recording material, from the external data processing device;

storage means for storing at least data received by the reception means;

a first supplying means for supplying the first recording material;

a second supplying means for supplying the second recording material which is manually replenished thereto;

control means for controlling the first supplying means or the second supplying means so as to supply the first recording material or the second recording material to the printer, and for controlling the printer so as to print the specified print data on the first recording material or the second recording material by sending the specified print data to the printer; and inhibiting means for inhibiting the control means from printing the specified print data by the printer if a predetermined period of time is yet to elapse since the specified print data was placed in the storage means even when another recording request which has no relationship with the specified print data has been made, and for allowing the control means to print the specified print data on the second recording material by the printer if the predetermined period of time has elapsed since the specified print data was placed in the storage means when said another recording request has been made.

41. The multi-functional device according to claim 40, wherein said control means controls the first supplying means so as to supply the first recording material to the printer in case that the second recording material has not been prepared in the second supplying means when said control means sends the specified print data to the printer.

* * * * *